Aug. 7, 1962

H. H. JOHNSON 3,048,038

TEMPERATURE-HUMIDITY INDEX INDICATOR

Filed Feb. 17, 1960

Aug. 7, 1962  H. H. JOHNSON  3,048,038
TEMPERATURE-HUMIDITY INDEX INDICATOR
Filed Feb. 17, 1960  4 Sheets-Sheet 3

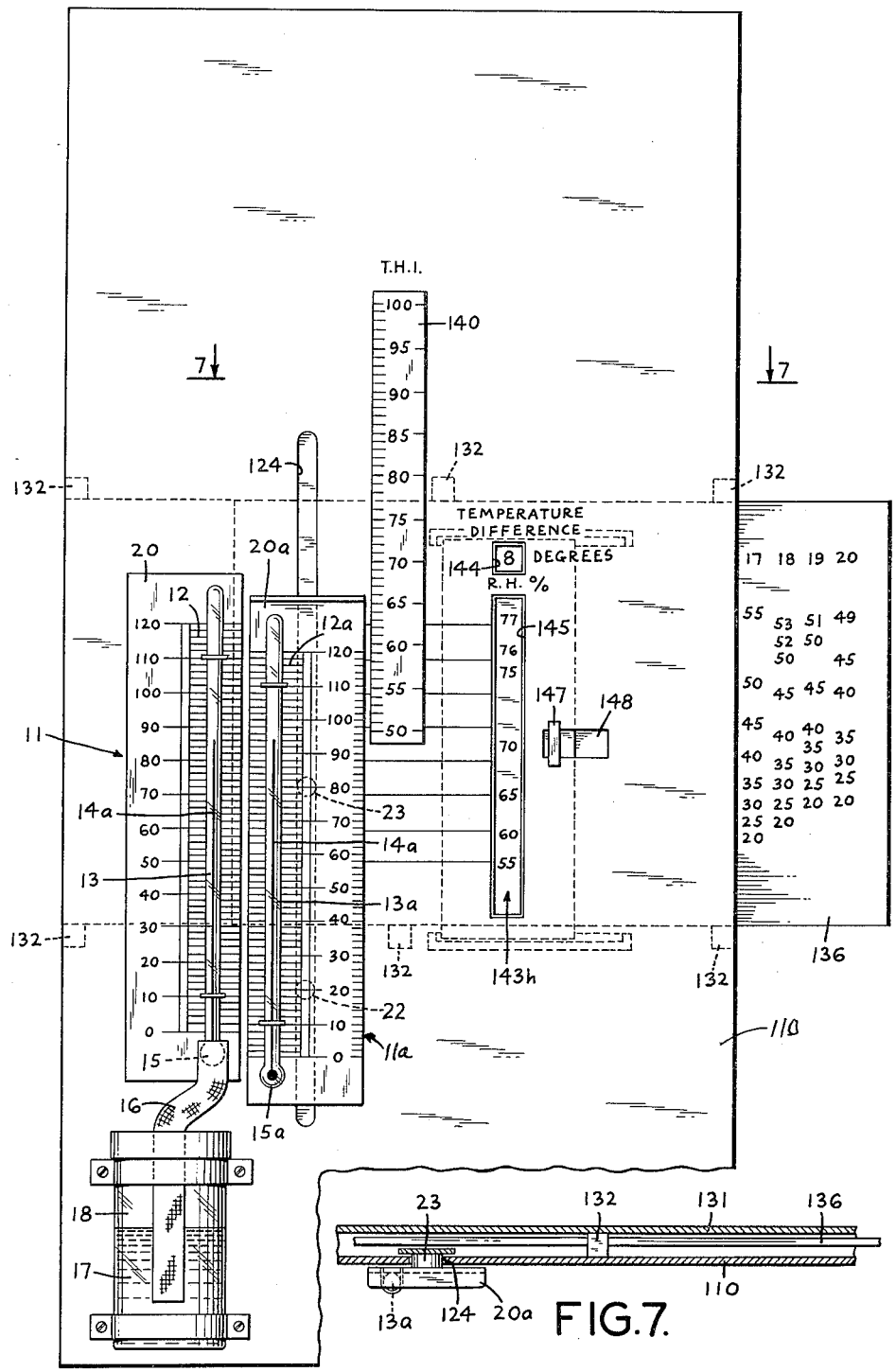

_United States Patent Office_

3,048,038
Patented Aug. 7, 1962

3,048,038
TEMPERATURE-HUMIDITY INDEX INDICATOR
Herman H. Johnson, 730 Riverside Drive,
New York, N.Y.
Filed Feb. 17, 1960, Ser. No. 9,351
10 Claims. (Cl. 73—338)

This invention relates to devices for determining and indicating the condition of the atmosphere with respect to the feeling of comfort or discomfort of persons. Briefly stated the invention relates to a device or instrument for indicating weather or atmospheric conditions in terms of an arbitrary temperature-humidity index number and the device is also adapted for indicating the relative humidity of the atmosphere.

Although the idea or concept of a scale or index to indicate the feeling of comfort or discomfort of a person in terms of an index number when subjected to various conditions of temperature and related humidity is not new, there has been developed in recent years an arbitrary formula for determining in terms of a scale of numbers, a factor now popularly known as, or called, the temperature-humidity index which is conveniently referred to by the initials: T. H. I. The formula now used by the United States Weather Bureau in the New York area is $$\text{T.H.I.} = 0.4(T_D + T_W) + 15$$

where

T.H.I. is the temperature-humidity index expressed as a number
$T_D$ is the dry-bulb thermometer, reading in degrees F.
$T_W$ is the wet-bulb thermometer, reading in degrees F.

My invention provides a device having a wet and a dry bulb thermometer and an arrangement whereby by a simple manipulation the T.H.I. for the then existent ambient atmosphere is indicated on a T.H.I. scale on which the T.H.I. is easily read. Also the device may be easily manipulated to indicate the relative humidity of the ambient atmosphere.

In accordance with my invention, a wet-bulb thermometer having a graduated temperature scale is mounted in stationary manner on a suitable frame or base member and a dry-bulb thermometer having a like graduated scale is mounted adjacent the wet-bulb thermometer on the base member adjacent the wet-bulb thermometer for slidable movement so that the scale of the dry-bulb thermometer moves relative to the fixed scale of the wet-bulb thermometer. A temperature-humidity index (T.H.I.) scale is fixedly mounted on the base member, in such a place that when the dry-bulb thermometer is moved to a position in which an index division, preferably the zero (0) mark on the thermometer scale is moved to a position opposite the temperature reading of the wet-bulb thermometer, the T.H.I. may be read on the T.H.I. scale directly opposite the temperature reading of the dry-bulb thermometer.

Also the device is so arranged that by moving the dry-bulb thermometer temperature reading to a position opposite the wet-bulb thermometer temperature reading, the temperature difference is indicated and a movable member on which is affixed a table showing relative humidity may be readily manipulated so that the relative humidity in terms of percent may be easily and quickly read, since the movable table is arranged so that the relative humidity of the ambient atmosphere will appear directly opposite the dry-bulb thermometer reading.

In a preferred embodiment of the invention, the device is such that a manually operated disc is operatively connected to the dry-bulb thermometer by a rack, and gear, and pinion arrangement so that the necessary movement of the dry-bulb thermometer in operating the device to indicate either T.H.I. or relative humidity may be brought about by manual rotation of the disc. Other modifications embodying the invention are mentioned and described hereinafter.

Although the novel features which are believed to be characteristic of the invention are pointed out in the appended claims, the invention itself as to its objects and advantages and the manner in which it may be carried out may be better understood by reference to the following description taken in connection with the accompanying drawings forming a part thereof, in which—

FIG. 4 is a view in section on line 4—4 of FIG. 1;

FIG. 5 is a view in section on line 5—5 of FIG. 2;

FIG. 6 is a face view partly broken away of a modification in which the dry-bulb thermometer is moved directly by hand as distinguished from mechanical operation through a rack and pinion and the relative humidity tables are on a manually slidable plate member;

FIG. 7 is a view in section on line 7—7 of FIG. 6; and

Figure 1:
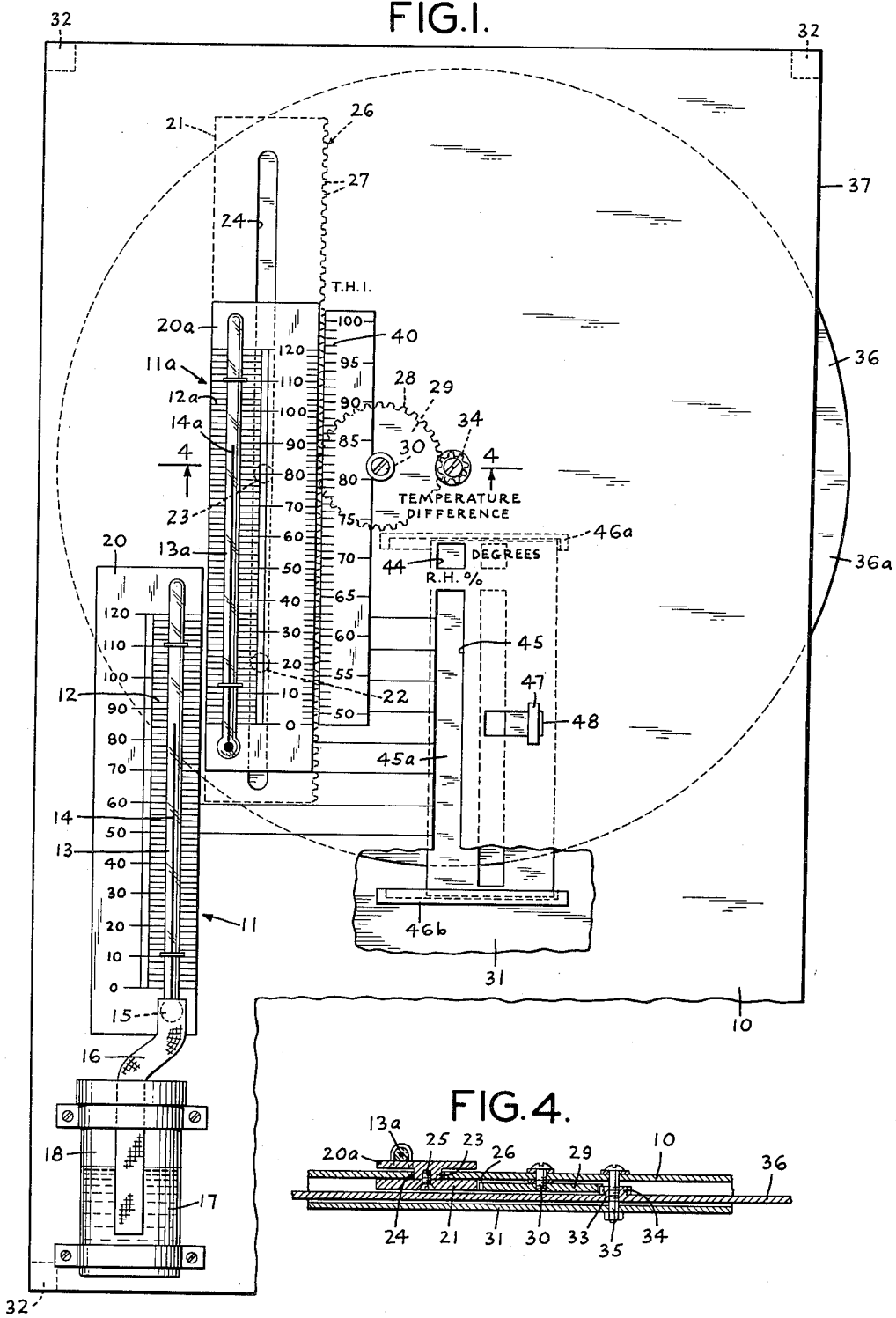
FIG. 1 is a face view in elevation of an instrument embodying the invention, partly broken away and showing the device with the dry-bulb in position to indicate T.H.I.

Referring now to the drawings in which like reference characters indicate like parts throughout the several views, the instrument as shown in FIG. 1 comprises a face base plate member 10 on which is fixedly mounted a wet-bulb thermometer 11 having a graduated temperature reading scale 12 of equal divisions. As shown, each small division equals two degrees Fahrenheit (° F.), there being main divisions in increments of ten degrees from 0° to 120°. The stem 13 of the thermometer is mounted on the scale. The stem contains liquid 14 such as colored alcohol or mercury, or other suitable liquid, which expands and contracts in response to changes in temperature. The bulb 15 of the thermometer is covered with a tubular, wetted, woven textile wick 16 which extends into a water bath 17 in a container 18 fixedly mounted on base member 10 below the wet-bulb thermometer 11.

Mounted on said base member 10 for vertical slidable movement relative to said web-bulb thermometer, is a dry-bulb thermometer 11a having a scale 12a graduated in the same way as scale 12 of the wet-bulb thermometer. The stems 13, 13a and liquid 14, 14a is the same in both the wet and dry-bulb thermometers 11 and 11a respectively. The difference is that 11 is a wet-bulb thermometer and 11a is a dry-bulb thermometer. The plate 20a, on which the thermometer scale 12a is located and on which is located thermometer stem 13a, is mounted to move upwardly and downwardly on the main plate 10 and this plate 20a also moves relatively to fixed plate 20 of the wet-bulb thermometer 11. The plate 20a is secured to a rack member 21, which is positioned behind face base member 10. The plate 20a is provided with a pair of outwardly and rearwardly extending bosses 22, 23 which are vertically slidable in a vertical guide slot 24 in the face member 10. The rack member 21 is removably secured to the thermometer plate 20a by means of screws 25 passing through the member 21 and screwed fast in each of bosses 22, 23.

The rack member 21 has a rack 26 along its inner, long edge whose teeth 27 engage and mesh with the teeth 28 of a gear 29 mounted to rotate about a shaft 30 extending between the face base plate 10 and a rear base plate 31 maintained in spaced relation with each other by spacers 32 secured to and mounted between the base plates 10 and 31.

The teeth of gear 29 engage and mesh with the teeth 33 of a pinion gear 34 mounted to rotate on shaft 35 extending through and fixed in face plate 10 and rear plate 31. The pinion gear 34 is fixed to a relatively large flat disc 36 also mounted to rotate about main shaft 35. It will be observed that a chord-area portion 36a of the disc 36 extends beyond the edge 37 of the face plate 10 and rear plate 31 so that the disc 36 can be rotated about its axis 35 by grasping the exposed peripheral portion 36a of the disc and manually rotating it. When the disc 36 is thus rotated, the pinion 34 is correspondingly rotated through the same angle of rotation. Also, the gear 29 is rotated through an angle of rotation depending on the ratio of the number of teeth on the pinion to the number of teeth on the gear 29. The rotation of the gear 29 causes a corresponding linear movement of the rack 26. Hence the rack member 21 and the thermometer 11a fixed to it (together with the thermometer scale 12a) move correspondingly in a linear direction.

Fixedly mounted on the face plate 10 alongside and parallel with the dry-bulb thermometer and its temperature scale 12a is a temperature-humidity index (T.H.I.) scale 40. This T.H.I. scale is calibrated in equal small divisions each representing one unit. The scale 40 is divided into main divisions of five units and as shown, the scale ranges from 50 to 100. This scale 40 is calibrated to show the T.H.I. number according to the formula mentioned above wherein the T.H.I. is equal to four-tenths (.4) of the sum of the dry-bulb thermometer reading and the wet-bulb thermometer reading plus the number fifteen (15).

In order to obtain the T.H.I. number or, as is usually stated, "the T.H.I.," at any given time for the place where the instrument is located, the dry-bulb thermometer is moved up or down, together with its scale 12a until the zero (0) division of the dry-bulb thermometer 11a is directly opposite the temperature reading of the wet-bulb thermometer 11 (see FIG. 1) whose scale is fixed and not movable on face plate 10. This, in effect, amounts to adding the dry and wet-bulb temperatures by adding the divisions of each at the reading of the mercury 14a (or other thermometer liquid used) since the small divisions of both thermometer scales are the same. Then the T.H.I. is read on the T.H.I. scale 40 directly opposite the dry-bulb thermometer reading. The T.H.I. scale 40 is calibrated to indicate four-tenths of the sum of the wet and dry-bulb temperatures plus fifteen.

The dry-bulb thermometer plate 20a may be moved manually by grasping it directly, or it may be moved by manually rotating the disc 36, which in turn rotates pinion 34, and gear 29 which in turn moves rack 21 correspondingly, but in a linear direction. As will be explained hereinafter, the gears and rack are so designed as to gear ratio that the instrument can be conveniently used for determining relative humidity as well as T.H.I. However, the instrument may be constructed to indicate only T.H.I. or constructed to indicate both T.H.I. and relative humidity, or only relative humidity.

Referring particularly to FIG. 1 the thermometers are shown in the position to indicate T.H.I. when the wet-bulb reading is 85° F. and the dry-bulb is 90° F. The zero (0) division of the dry-bulb thermometer has been moved to a position directly opposite the web-bulb thermometer reading. The T.H.I. is indicated on the T.H.I. scale 40. In this instance, the T.H.I. is 85 (T.H.I.) which is the reading on scale 40, directly opposite the dry-bulb thermometer reading which is 90° F. It will be observed that by placing the zero (0) division of the dry-bulb thermometer opposite the reading of the wet-bulb thermometer is, in effect, adding mechanically the wet and dry-bulb temperatures.

As mentioned above, the instrument is also adapted for indicating relative humidity. It is known, of course, that relative humidity is determined by obtaining the temperature difference between the wet and dry-bulb reading and then determining the relative humidity for the dry-bulb temperature, it being known and understood that for any given dry-bulb temperature the relative humidity will vary according to the difference between the dry-bulb and wet-bulb thermometer readings. Tables for these conditions have been worked out and are published and well known. In this instrument, as disclosed in FIGS. 1 to 5, there is a column of relative humidities worked out for each number of difference in degrees between wet and dry-bulb thermometer readings; the figures which represent relative humidities being positioned in their proper column in a predetermined position so that the relative humidity can readily be ascertained for the particular dry-bulb thermometer reading at the time and place the instrument is used for indicating relative humidity.

In the embodiment now being described, namely, the instrument illustrated in FIGS. 1 to 5, the figures for temperature difference are positioned in a circular line on the face of and circumferentially spaced about the axis of the rotatable disc 36. The circumferential spacing is correlated with the linear vertical movement of the dry-bulb thermometer 11a. That is, for linear movement in equal increments, there will be rotational or angular movement of the disc about its axis in equal angular increments corresponding to the same linear increments of movement of the dry-bulb thermometer.

Figures 3, 8:
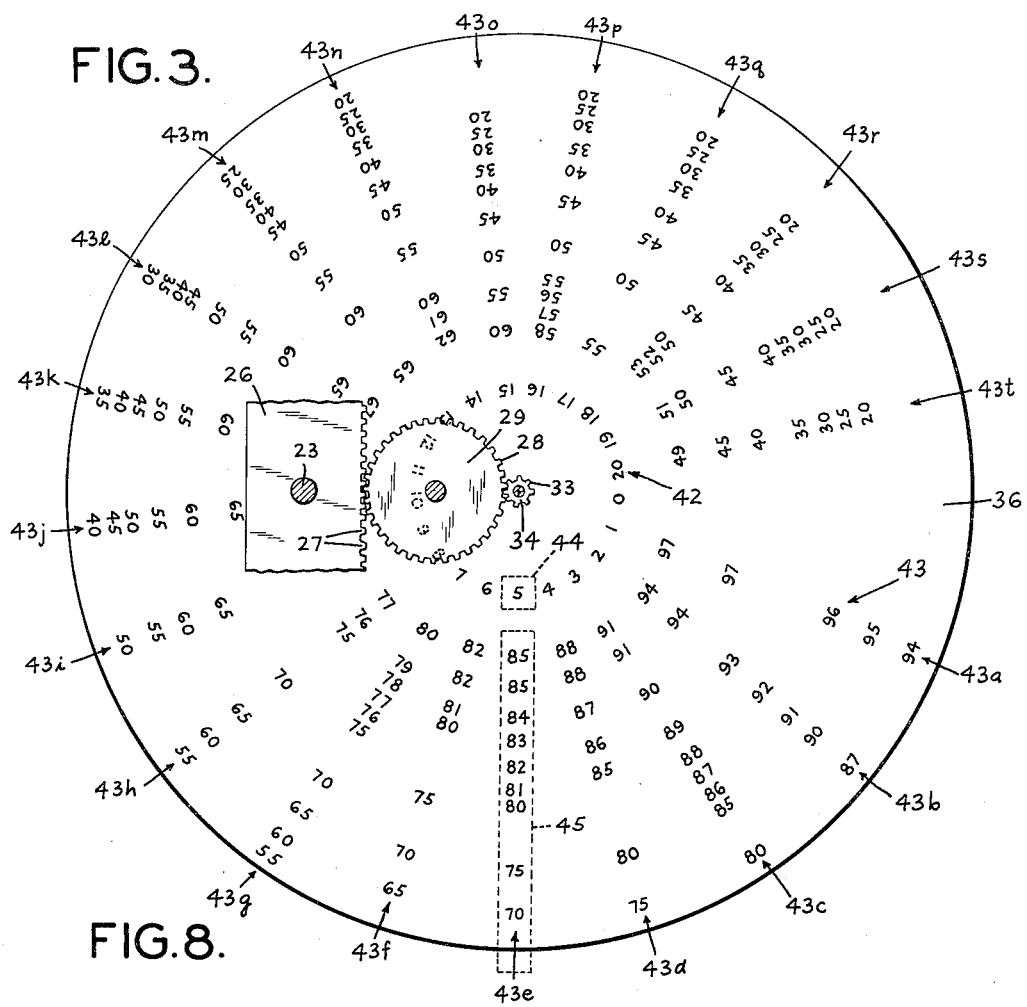
FIG. 3 is a face view of the disc which is a part of the instrument shown in FIGS. 1 and 2, and showing the relative humidity tables thereon.
FIG. 8 is a face view of the plate member in the instrument shown in FIG. 6, showing the relative humidity tables.

Referring now to FIG. 3 which shows the face of disc 36, it will be seen that the inner circular row 42 of figures has numerals from 0 to 20 spaced at equal angular distances apart. Each of these figures represents a temperature difference between the wet and dry-bulb thermometer readings. Hence, this circular row of figures is herein for convenience called the "temperature difference" figures. Radially arranged in line with each "temperature difference" figure is a column of figures 43 (a to t), these figures representing "relative humidity" in terms of percent. These figures are arranged so that when the instrument is used to determine and indicate relative humidity, the relative humidity figure is indicated at a position directly opposite the dry-bulb temperature reading when the dry-bulb is moved to a position where its temperature reading is directly opposite the wet-bulb thermometer reading.

In order to obtain the temperature difference between the wet and dry-bulb thermometer readings the dry-bulb thermometer 11a and its scale 12a is moved downwardly or upwardly, as the case may be, until the reading of the dry-bulb thermometer is opposite the reading of the wet-bulb thermometer. Inasmuch as the divisions on the scale 12a of the dry-bulb thermometer are the same as the divisions on the scale 12 of the wet-bulb thermometer, the difference between the wet and dry-bulb readings in degrees will be readily determined by the reading on the dry-bulb scale directly opposite the zero (0) division on the wet-bulb scale (see FIG. 2). The teeth on pinion 34, gear 29 and rack 26 are so designed and in such ratio that the movement of the disc will bring the "temperature difference" figure in the circular row 42 to a place in front of the temperature difference window 44 in the face plate 10. Hence, if the temperature difference between the wet and dry-bulb temperatures is 5° F., and the dry-bulb thermometer is moved to a place where its reading is opposite the temperature difference figure "5°" in circular in row 42 is automatically brought to a place in front of window 44 in the face plate. This also automatically brings the column 43e of relative humidity figures opposite the elongate window or slot 45 in the face plate 10. The relative humidity for the then atmospheric conditions is indicated directly opposite the dry-bulb thermometer reading. It will be understood that the radially arranged columns of figures on the disc 36 are so arranged that the relative humidity for any dry-bulb reading for any given temperature difference is positioned directly opposite the temperature reading of the dry-bulb thermometer. It may be observed that a shade 45a positioned behind face plate 10 and horizontally slidable in suitable guideways 46a, 46b, and manipulated by a small handle 47 extending through a slot 48, may be maneuvered to close or open the window 44 and slot 45. However, this is a refinement that may, if desired, be dispensed with. Also, there need not be a window such as 44 since the gearing of the disc 36, as shown is such that the proper "degree difference" figure is automatically brought to the place which brings the proper column of relative humidity figures in registry with slot 45 when the thermometer readings of the wet and dry-bulbs are brought opposite each other.

Figure 2:
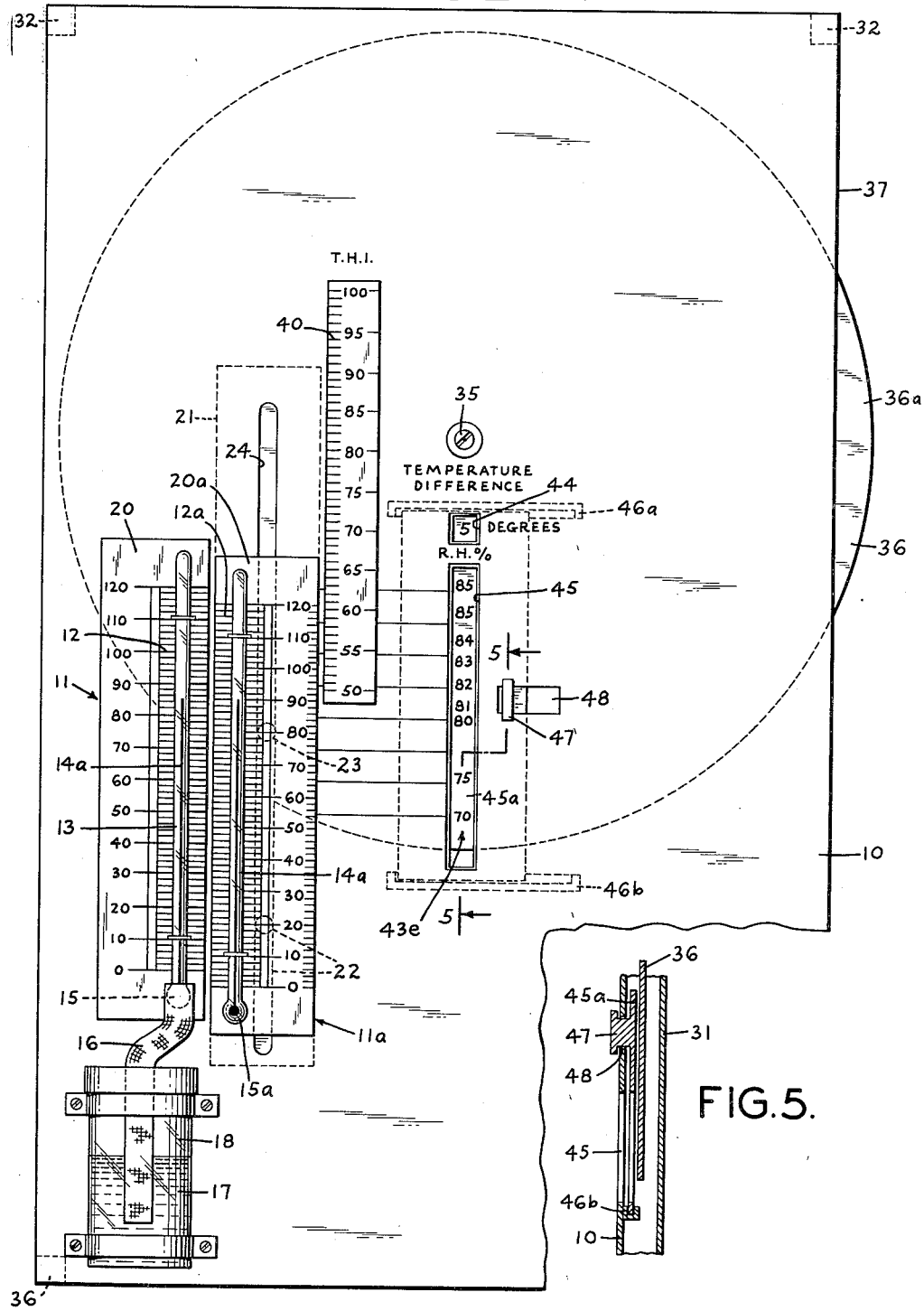
FIG. 2 is a face view in elevation of the instrument shown in FIG. 1 but showing the device with the dry-bulb in position to indicate relative humidity.

FIG. 2 shows the position of the various parts of the instrument for indicating relative humidity when the wet-bulb reading is 85° F. and the dry-bulb reading is 90° F. The disc 36 has been rotated to bring the dry and wet-bulb readings opposite one another. This shows on the dry-bulb scale a temperature difference of 5° F. Also the difference of 5° F. between wet and dry-bulb readings shows in window 44 and the column 43e of relative humidity figures in percent is brought into registry with open windows 45 in face plate 10. The relative humidity of 81% is shown directly opposite the dry-bulb thermometer reading, which in this instance is 90° F.

It will be understood that the relative humidity for all conditions of dry-bulb and wet-bulb differences and for all dry-bulb temperature conditions are placed in the table on the disc in proper places to indicate the relative humidity in percent for all normally expected temperature conditions and are so arranged that the relative humidity in percent will be opposite the dry-bulb temperature reading.

It may be noted here that the gearing and rack arrangement may, if desired, be eliminated and the parts operated manually, but the automatic arrangement is a very desirable advantage in the disc-table type of instrument illustrated in FIGS. 1 to 5.

The modification illustrated in FIGS. 6 to 8 is in many respects the same as the instrument illustrated in FIGS. 1 to 5. It differs in that no disc or gearing is employed to move the dry-bulb thermometer, and instead of placing the relative humidity table on a rotatable disc, the relative humidity table is arranged in straight lines on a plate that is horizontally slidable manually to bring the proper column of the table in registry with the viewing window.

The instrument as shown in FIGS. 6 to 8 comprises a face plate 110 on which is fixedly mounted a wet-bulb thermometer 11 of the same construction as wet-bulb thermometer 11 shown in FIG. 1. A dry-bulb thermometer 11a like the dry-bulb thermometer shown in FIG. 1 is mounted for vertical slidable movement as in the embodiment shown in FIG. 1, except that a rack is not used; only screws 22, 23 extending through slot 124. A scale 140 like T.H.I. scale 40 is fixedly mounted on the face plate 110 as in FIG. 1. Now it may be observed that to determine T.H.I. with the instrument illustrated in FIGS. 6 to 8, the dry-bulb may be moved manually up and down by grasping the dry-bulb thermometer. To determine T.H.I. the dry-bulb thermometer is moved until its zero (0) division is opposite the wet-bulb thermometer reading. The T.H.I. is the number on scale 140 opposite the dry-bulb thermometer reading, just as in the instrument illustrated in FIGS. 1–5.

To determine relative humidity the dry-bulb thermometer is moved until the wet- and dry-bulb readings are opposite each other as illustrated in FIG. 6. The temperature difference between the wet- and dry-bulb temperatures is then readily determined by reading the dry-bulb scale 12a opposite the zero (0) division on the wet-bulb scale 12. In the instance shown in FIG. 6, the difference is 8° F.; the dry-bulb temperature being 94° F. and the wet-bulb temperature being 86° F.

The relative humidity tables, in this embodiment, are placed on a flat horizontally movable plate 136 which is manually slidable in guideways 132 between the face plate 110 and back plate 131. In this instance the row of temperature difference figures is arranged in a horizontal line 142 and the relative humidity figures in percentage are arranged in vertical columns 143 (a to t) as shown in FIG. 8. The relative humidity percentage figures are arranged so that the relative humidity for a given set of conditions may be read directly opposite the dry-bulb thermometer reading, when the dry-bulb thermometer is moved so that its reading is opposite the wet-bulb thermometer reading and the temperature difference column on plate 136 as shown on the instrument is moved to a position in registry with window 144 to bring the proper column of relative humidity figures in registry with open slot 145. In the illustration shown in FIG. 6, the temperature difference is 8° F., so the relative humidity is 71% on scale 143h which is the reading opposite the dry-bulb temperature 94° F. It will be understood, of course, that for each temperature difference, the relative humidity for the dry-bulb temperature will be shown opposite the dry-bulb reading when the proper temperature difference is brought into registry with slot 145.

In the foregoing I have set forth the formula or equation now being used by the United States Weather Bureau at New York, New York for determining T.H.I. It is conceivable that this formula may be changed somewhat in the future to indicate the T.H.I. as a number which may be different from the present scale of numbers. It will be understood from the foregoing description that an instrument in accordance with my invention, instead of being calibrated to indicate T.H.I. as $.4(T_D+T_W)+15$, may be calibrated to accord with changes in the foregoing formula, if that formula should later be changed.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An instrument for indicating temperature-humidity conditions of the ambient atmosphere in terms of a temperature-humidity index number which comprises a base member, a wet-bulb thermometer having a temperature scale calibrated in equal increments of temperature degrees, said wet-bulb thermometer scale having a zero mark, a dry-bulb thermometer having a temperature scale calibrated in equal increments of temperature degrees, said dry-bulb thermometer scale having a zero mark, said dry-bulb thermometer being mounted for movement on said base member so that said dry-bulb thermometer scale may be moved in a linear direction alongside said wet-bulb thermometer and in a path of sufficient amplitude to permit the zero mark of said dry-bulb scale to be placed opposite the thermometer reading on said wet-bulb scale, a temperature-humidity index scale fixedly mounted on said base member adjacent said dry-bulb scale and calibrated to indicate the temperature-humidity conditions in terms of a temperature-humidity index member, the temperature-humidity index number for the then existing conditions of the ambient atmosphere appearing on the temperature-humidity index scale opposite the dry-bulb thermometer reading when the zero mark of said dry-bulb scale is moved to a position opposite the wet-bulb thermometer reading.

2. An instrument constructed according to claim 1 in which the dry-bulb scale reading opposite the zero mark on the wet-bulb scale indicates the temperature difference between the wet-bulb thermometer temperature and the dry-bulb thermometer temperature for the ambient atmosphere when the two thermometers are placed in the position in which the temperature readings of each are placed opposite to one another, and the instrument includes a relative humidity table to show the relative humidity in terms of percentage for the dry-bulb temperature reading for each number representing temperature difference between wet and dry-bulb thermometer readings.

3. An instrument for indicating temperature-humidity conditions of the ambient atmosphere in terms of a temperature-humidity index number which comprises a base member, a wet-bulb thermometer having a temperature scale calibrated in equal increments of temperature degrees, said wet-bulb thermometer scale having a zero mark, a dry-bulb thermometer having a temperature scale calibrated in equal increments of temperature degrees, said dry-bulb thermometer scale having a zero mark, said dry-bulb thermometer being mounted for movement on said base member so that said dry-bulb thermometer scale may be moved linearly alongside said wet-bulb thermometer and in a path of sufficient amplitude to permit the zero mark of said dry-bulb scale to be placed opposite the thermometer reading on said wet-bulb scale, a temperature-humidity index scale fixedly mounted on said base member adjacent said dry-bulb scale and calibrated to indicate the temperature-humidity conditions in terms of a temperature-humidity index number, the temperature-humidity index number for the then existing conditions of the ambient atmosphere appearing on the temperature-humidity index scale opposite the dry-bulb thermometer reading when the zero mark of said dry-bulb scale is moved to a position opposite the wet-bulb thermometer reading, and manually operable means mounted on said base member and connected with said dry-bulb thermometer, said dry-bulb thermometer moving in said path in response to manipulation of said manually operable means.

4. An instrument constructed according to claim 3 in which said manually operable means comprises a disc mounted on said base member for rotation, a gear tooth rack secured to and movable with said dry-bulb thermometer, and gearing rotatable by said disc having teeth meshing with the gear teeth of said rack.

5. An instrument constructed according to claim 4 in which said rotatable gearing comprises a pinion gear secured to said disc and rotatable about the axis of said disc in response to rotation of said disc, and a gear wheel mounted on said base member for rotation with its gear teeth meshing with the gear teeth of said pinion and the gear teeth of said rack.

6. An instrument constructed according to claim 5 in which radially arranged columns of figures representing relative humidity in percentage are positioned in radial alignment with figures representing temperature difference between the wet-bulb and dry-bulb thermometer readings, and the temperature difference figures are arranged on said disc in a circle about the axis of said disc and circumferentially spaced in said circle.

7. An instrument constructed according to claim 6 in which said temperature difference figures are circumferentially spaced and said gears have a gear ratio which correlates the angular movement of temperature difference figures with the linear movement of said dry-bulb thermometer.

8. An instrument constructed according to claim 7 in which said disc is mounted behind the base member which serves as a face member of said instrument and in which a window means is provided in the face member to expose that column of relative humidity figures which corresponds to the temperature difference shown on the dry-bulb scale opposite the zero mark on the wet-bulb scale when the temperature readings on the wet-bulb scale and the dry-bulb scale are placed directly opposite each other.

9. An instrument for indicating temperature-humidity conditions of the ambient atmosphere in terms of a temperature-humidity index number which comprises a base member; a wet-bulb thermometer having a temperature scale calibrated in equal increments of temperature degrees, said wet-bulb thermometer having a zero mark; a dry-bulb thermometer having a temperature scale calibrated in equal increments of temperature degrees, said dry-bulb thermometer having a zero mark one of said thermometers with its scale being fixedly mounted on said base member and the other of said thermometers with its scale being mounted for linear movement parallel to said fixed thermometer on said base member so that said movable thermometer with its scale may be moved in a linear direction alongside said fixed thermometer with its scale may be moved in a linear direction alongside said fixed thermometer and its scale and in a path of sufficient amplitude to permit the zero mark of said movable thermometer scale to be placed opposite the thermometer reading on said fixed thermometer scale; a temperature-humidity index scale fixedly mounted on said base member adjacent said movable thermometer scale and calibrated to indicate the temperature-humidity conditions in terms of a temperature-humidity index number; the temperature-humidity index number for the then existing conditions of the ambient atmosphere appearing on the temperature-humidity index scale opposite said movable thermometer temperature reading when the zero mark of said movable thermometer scale is moved to a position opposite the fixed thermometer temperature reading.

10. An instrument constructed according to claim 9 including manually operable means mounted on said base member and connected with said movable thermometer, said movable thermometer moving in said linear path in response to manipulation of said manually operable means.

References Cited in the file of this patent
UNITED STATES PATENTS

| | | |
|---|---|---|
| 1,933,283 | Schwartz | Oct. 31, 1933 |
| 2,681,572 | Lamb | June 22, 1954 |

OTHER REFERENCES

Thom, E. C.: "Cooling Degrees Days," Air Conditioning Heating and Ventilating's, July 1958.

UNITED STATES PATENT OFFICE
CERTIFICATE OF CORRECTION

Patent No. 3,048,038                                August 7, 1962

Herman H. Johnson

It is hereby certified that error appears in the above numbered patent requiring correction and that the said Letters Patent should read as corrected below.

Column 8, line 23, after "mark" insert a semicolon; lines 28 to 30, strike out "with its scale may be moved in a linear direction alongside said fixed thermometer".

Signed and sealed this 18th day of December 1962.

(SEAL)
Attest:

ERNEST W. SWIDER                                DAVID L. LADD
Attesting Officer                                     Commissioner of Patents